United States Patent

Wetzel et al.

[11] Patent Number: 5,646,453
[45] Date of Patent: Jul. 8, 1997

[54] DIGITAL DIMMING AND FLASHING CIRCUIT FOR LOCOMOTIVE DITCH LIGHTS

[75] Inventors: Donald C. Wetzel, Berea; Robert A. Livsey, Richmond Heights, both of Ohio

[73] Assignee: Meg Trans Corp., Berea, Ohio

[21] Appl. No.: 284,255

[22] Filed: Aug. 2, 1994

Related U.S. Application Data

[63] Continuation-in-part of Ser. No. 82,617, Jun. 25, 1993, Pat. No. 5,534,733.

[51] Int. Cl.$^6$ ............................................. H05B 37/02
[52] U.S. Cl. ............................................. 307/10.1
[58] Field of Search ........................... 340/471, 458, 340/463, 464, 642, 641; 307/10.1, 10.8

[56] References Cited

U.S. PATENT DOCUMENTS

| | | | |
|---|---|---|---|
| 3,805,167 | 4/1974 | Nash et al. | 307/265 |
| 4,114,071 | 9/1978 | Thrower et al. | 315/82 |
| 4,171,526 | 10/1979 | Bauer | 346/23 |
| 4,213,115 | 7/1980 | Wetzel | 340/47 |
| 4,284,926 | 8/1981 | Dinges | 315/312 |
| 4,325,007 | 4/1982 | Prohaska et al. | 315/200 A |
| 4,388,558 | 6/1983 | Mizuno et al. | 315/77 |
| 4,408,142 | 10/1983 | Wilje | 315/82 |
| 4,426,638 | 1/1984 | Donley et al. | 340/74 |
| 4,564,789 | 1/1986 | Kokubu | 315/79 |
| 4,691,330 | 9/1987 | Takahashi et al. | 377/39 |
| 4,841,198 | 6/1989 | Wilhelm | 307/10.8 |
| 4,845,465 | 7/1989 | Kruse et al. | 340/468 |
| 4,845,619 | 7/1989 | Steely et al. | 364/424.05 |
| 4,904,998 | 2/1990 | Niimi | 340/908.1 |
| 4,935,641 | 6/1990 | Wilhelm | 307/10.8 |
| 5,075,593 | 12/1991 | Shoda | 315/82 |
| 5,247,280 | 9/1993 | Incorvaia et al. | 340/471 |

*Primary Examiner*—Aditya Krishnan
*Attorney, Agent, or Firm*—Rankin, Hill, Lewis & Clark

[57] ABSTRACT

A light is dimmed by pulsing it at a selected duty cycle. By pulsing, the light can be dimmed without being turned off completely which reduces wear on the filament. The circuit is designed for flashing a pair of ditch lights on a railroad locomotive. The lights are alternately illuminated at full voltage and dimmed by pulsing. The flashing sequence can be activated when the locomotive is travelling below a selected speed or when the horn is sounded. The duration of the flashing sequence is controlled by a timer. The pulsing circuit can be used to effectively reduce a voltage without voltage dropping resistors.

19 Claims, 7 Drawing Sheets

| CONTROL SWITCH 25 | TIMER 34 | COUNTER 45 | | | | LIGHTS | |
|---|---|---|---|---|---|---|---|
| | | 1 Hz | 256 Hz | | | | |
| | | Q12 | Q4 | Q3 | Q2 | 13 | 14 |
| 1 | 0 | X | X | X | X | 1 | 1 |
| 0 | 0 | X | X | X | X | 0 | 0 |
| X | 1 | 0 | 0 | 0 | 0 | 0 | 1 |
| | | 0 | 0 | 0 | 1 | 0 | 1 |
| | | 0 | 0 | 1 | 0 | 0 | 1 |
| | | 0 | 0 | 1 | 1 | 0 | 1 |
| | | 0 | 1 | 0 | 0 | 1 | 1 |
| | | 0 | 1 | 0 | 1 | 0 | 1 |
| | | 0 | 1 | 1 | 0 | 0 | 1 |
| | | 0 | 1 | 1 | 1 | 0 | 1 |
| | | 1 | 0 | 0 | 0 | 1 | 0 |
| | | 1 | 0 | 0 | 1 | 1 | 0 |
| | | 1 | 0 | 1 | 0 | 1 | 0 |
| | | 1 | 0 | 1 | 1 | 1 | 0 |
| | | 1 | 1 | 0 | 0 | 1 | 1 |
| | | 1 | 1 | 0 | 1 | 1 | 0 |
| | | 1 | 1 | 1 | 0 | 1 | 0 |
| | | 1 | 1 | 1 | 1 | 1 | 0 |

| COUNTER 103 | | | | COMPARATOR 104 | | | | | | | | LIGHT 11 | | |
|---|---|---|---|---|---|---|---|---|---|---|---|---|---|---|
| 128 Hz | | | | | | | | (POSITION 107b) | | | | SWITCH POSITION | | |
| Q5 | Q4 | Q3 | Q2 | A1 | A2 | A3 | A4 | B1 | B2 | B3 | B4 | 107b | 107a | 107c |
| 0 | 0 | 0 | 0 | 0 | 0 | 0 | 0 | 1 | 0 | 1 | 1 | 1 | 1 | 1 |
| 0 | 0 | 0 | 1 | 1 | 0 | 0 | 0 | 1 | 0 | 1 | 1 | 1 | 1 | 1 |
| 0 | 0 | 1 | 0 | 0 | 1 | 0 | 0 | 1 | 0 | 1 | 1 | 1 | 1 | 1 |
| 0 | 0 | 1 | 1 | 1 | 1 | 0 | 0 | 1 | 0 | 1 | 1 | 0 | 1 | 0 |
| 0 | 1 | 0 | 0 | 0 | 0 | 1 | 0 | 1 | 0 | 1 | 1 | 1 | 1 | 1 |
| 0 | 1 | 0 | 0 | 1 | 0 | 1 | 0 | 1 | 0 | 1 | 1 | 1 | 1 | 0 |
| 0 | 1 | 1 | 0 | 0 | 1 | 1 | 0 | 1 | 0 | 1 | 1 | 1 | 1 | 1 |
| 0 | 1 | 1 | 1 | 1 | 1 | 1 | 0 | 1 | 0 | 1 | 1 | 0 | 1 | 0 |
| 1 | 0 | 0 | 0 | 0 | 0 | 0 | 1 | 1 | 0 | 1 | 1 | 1 | 1 | 1 |
| 1 | 0 | 0 | 1 | 1 | 0 | 0 | 1 | 1 | 0 | 1 | 1 | 1 | 1 | 0 |
| 1 | 0 | 1 | 0 | 0 | 1 | 0 | 1 | 1 | 0 | 1 | 1 | 1 | 1 | 1 |
| 1 | 0 | 1 | 1 | 1 | 1 | 0 | 1 | 1 | 0 | 1 | 1 | 0 | 1 | 0 |
| 1 | 1 | 0 | 0 | 0 | 0 | 1 | 1 | 1 | 0 | 1 | 1 | 1 | 1 | 1 |
| 1 | 1 | 0 | 1 | 1 | 0 | 1 | 1 | 1 | 0 | 1 | 1 | 1 | 1 | 0 |
| 1 | 1 | 1 | 0 | 0 | 1 | 1 | 1 | 1 | 0 | 1 | 1 | 1 | 1 | 1 |
| 1 | 1 | 1 | 1 | 1 | 1 | 1 | 1 | 1 | 0 | 1 | 1 | 0 | 1 | 0 |

Fig.6

DIGITAL DIMMING AND FLASHING CIRCUIT FOR LOCOMOTIVE DITCH LIGHTS

REFERENCE TO RELATED APPLICATION

This application is a continuation-in-part of patent application Ser. No. 08/082,617, filed June 25, 1993, now U.S. Pat. No. 5,534,733.

BACKGROUND OF THE INVENTION

1. Field of the Invention

This invention relates to generally the field of light dimming, and specifically, to a ditch light flashing circuit for railroad locomotives.

2. Description of the Prior Art

Locomotives have numerous exterior lights serving various purposes. Among these are ditch lights which illuminate an area of the ground ahead of and on either side of the locomotive, that is, the "ditch" along the railroad right-of-way. Railroad safety regulations sometime require that the ditch lights flash to provide a warning to persons at grade crossings that the locomotive is approaching. Typically, the ditch lights are located near each corner of the locomotive to provide the warning in either direction of travel and on both sides of the locomotive.

Lights are typically flashed by alternately applying a voltage and interrupting the voltage. When the voltage is interrupted, the light assumes an "OFF" state. It has been found that the life of an incandescent filament lamp is shortened by the shock of repeatedly applying its rated voltage after extinguishing the lamp. For example, U.S. Pat. No. 4,904,998 to Niimi shows a digital flashing circuit using a timer and a counter. Lights are flashed by alternately fully energizing and de-energizing them.

To avoid this shock effect, resistors have been connected in series with the lamp to reduce its illumination to a dull glow during "OFF" periods. In AC systems, an inductive choke has been used. These dimming circuits waste energy dissipated from the resistors, or other devices. Headlights are also utilized at each end of a locomotive to illuminate the right-of-way ahead of the locomotive. The headlights generally do not flash, but may have several levels of illumination, for example, full, medium, and dim. To dim the headlights, resistors are commonly connected in series with the lights to reduce the voltage across the lights. The resistors dissipate energy when the lights are dimmed.

It is desirable to have a flashing circuit which does not completely interrupt the voltage to the lamp during an "OFF" state of the flashing sequence, thereby increasing the service life of the lamp. The use of dimming resistors should be eliminated to save energy and reduce heat. When applied to locomotive ditch lights, such a circuit should operate automatically at appropriate times during locomotive operation.

It would also be desirable to have a circuit which effectively dims a locomotive headlight without the need for voltage dropping resistors.

An additional problem is caused when the lamps fail. Incandescent lamps fail after many hours of use as the filament evaporates and thins down and a break occurs. This phenomenon is often experienced with household light bulbs which flash when a switch is turned on and the lamp fails. Electronic circuits, such as those which may be used to control flashing and dimming of locomotive lights, cannot withstand even a momentary overload such as might be produced when an incandescent lamp leads arc at the end of life. Most electronic circuits are much more sensitive to current overloads than a lamp fuse or a line current circuit breaker, causing the electronic circuit to be damaged when the lamp fails.

SUMMARY OF THE INVENTION

The present invention is a control circuit for an element connectable across a voltage. The circuit includes switch means connected to control the voltage across the element and dimming means connected to control the switch means to selectively energize the element with a series of voltage pulses at a specific duty cycle.

The circuit "dims", that is, effectively drops the voltage across, an element or component. A timer is used to generate a series of clock pulses which are input to a counter. Outputs of the counter are combined in a logic circuit or compared to a selected input value to provide the desired pulses at a selected frequency and duty cycle.

In the embodiments shown, the element is a light, such as an incandescent lamp. The circuit can be adapted to select one of several different levels of illumination. By dimming a light in this manner, voltage dropping resistors, such as rheostats, are not required.

The circuit can be adapted to alternate between two levels of illumination to flash the light. The lower level can be relatively imperceptible illumination and the higher level can be full illumination.

The circuit can be used to control warning lights on a vehicle, such as a railroad locomotive. For example, the lights can be large wattage ditch lights located near four corners of a locomotive to flash and illuminate an area adjacent a track on which the locomotive rides to provide a warning to persons at grade crossings. Two lights at each end are alternately illuminated and pulsed so as to be dimmed. By pulsing the light when it is dimmed, the life of the light is extended by reducing the shock to the filament which occurs when the light is alternately fully illuminated and fully extinguished. The preferred duty cycle and frequency of the pulses are dependent on the power rating of the lights and the magnitude of the voltage.

A timer is used to enable the dimming circuit. When the timer is triggered, a flashing sequence is initiated for a specified time. The timer can be triggered by a sensed condition such as motion of the locomotive, adjustment of a throttle, sounding a horn, or pressing a test switch.

A control switch is provided to fully illuminate both lights continuously. The timer is connected to override the control switch when the timer is triggered.

To prevent damage to the flashing and dimming circuit which may occur when the filament of the lamp of the light fails and arcs over, an overcurrent protection circuit is provided. The overcurrent protection circuit effectively disconnects the sensitive electronic circuit from the lamp when an overcurrent situation is detected.

In addition, the overcurrent protection circuit automatically resets itself when the overcurrent situation ends. The overcurrent protection circuit includes a latch attached to an appropriate timing circuit which continually tests the circuit to determine if the overcurrent situation has ended, and if it has, resets the circuit to allow continued operation of the light when the lamp has been replaced. This avoids the necessity of manually resetting the circuit when replacing a burned-out lamp.

These and other advantages are provided by the present invention of a control circuit for an element connectable across a voltage. The control circuit comprises switch means connected to control the voltage across the element, and dimming means connected to control the switch means for selectively energizing the element with a series of voltage pulses at a specific duty cycle.

DETAILED DESCRIPTION OF THE PREFERRED EMBODIMENT

Figure 1:
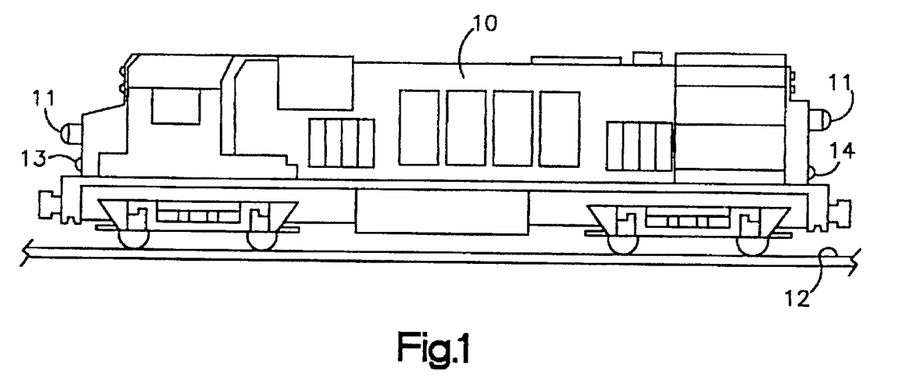
FIG. 1 is a side elevational view of a railroad locomotive according to the invention.

Referring more particularly to the drawings and initially to FIG. 1, there is shown a railroad locomotive 10 having a headlight 11 at each end adapted to illuminate a right-of-way ahead of the locomotive in whichever direction the locomotive is travelling on a track 12. Pairs of ditch lights 13 and 14 are provided at each end of the locomotive 10 as well. A left side ditch light 13 and a right side ditch light 14 are provided at each end to illuminate an area around the track 12 and ahead of the locomotive 10 on the left and right sides of the locomotive, respectively. Thus, the lights 13 and 14 are directed forwardly, downwardly, and outwardly from the locomotive. The lights 13 and 14 are adapted to burn steadily for illumination or to flash thereby providing a warning signal to people in the vicinity of the track 12.

Figure 2:
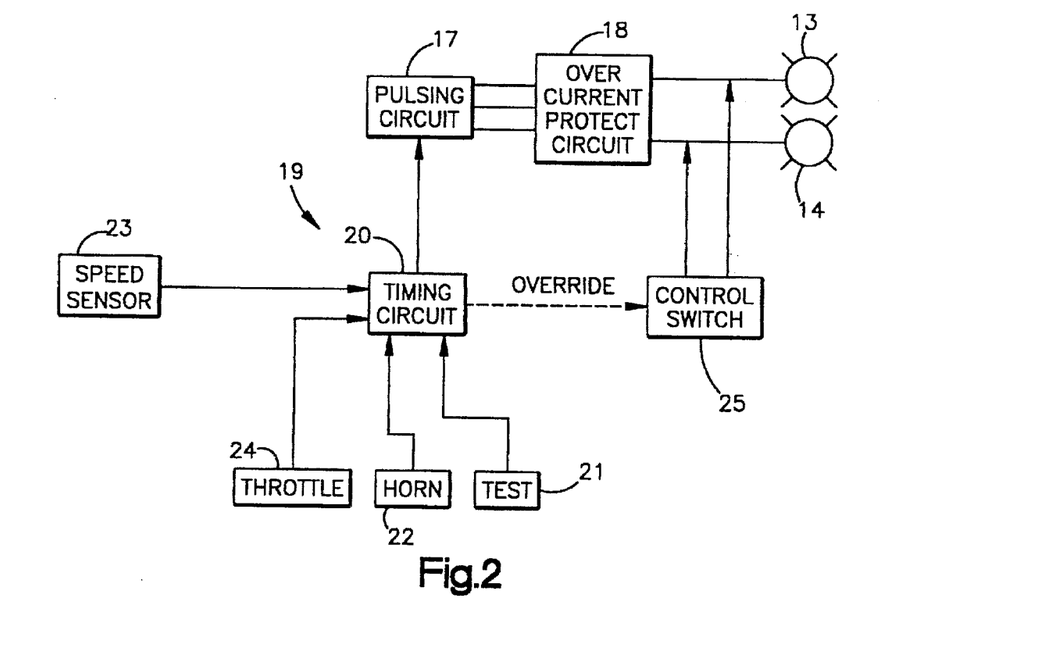
FIG. 2 is a block diagram of the flashing circuit.

The lights 13 and 14 are connected to an appropriate voltage source, and voltage across each of the lights is controlled by a suitable switch, such as field effect transistors (FETs). As shown in FIG. 2, the gating signal for the FETs is provided by a pulsing circuit 17 An overcurrent protection circuit 18 may be interposed between the pulsing circuit 17 and the lights 13 and 14. An enabling circuit 19 is provided to control activation of the flashing sequence. The enabling circuit 19 includes a timing circuit 20. The timing circuit 20 can be triggered upon the occurrence of a specified condition by a condition responsive means. Several examples are shown which would be preferred for the locomotive ditch light flashing system. One condition responsive trigger means shown is a test switch 21. A horn switch 22, closed when a horn on the locomotive is sounded, can be used to enable the flashing sequence in a similar manner to the test switch 21. A speed sensor 23 can be connected to the timing circuit 20. Instead of sensing locomotive speed, a throttle switch 24 can be connected in a similar manner to the speed sensor 23 to enable the flashing sequence when the throttle is adjusted or is set within a selected range of locations. In some cases it may be desirable to fully illuminate the lights 13 and 14 without flashing, and a control switch circuit 25 is provided for this purpose.

The pulsing circuit 17, the overcurrent protection circuit 18, the enabling circuit 19, the timing circuit 20, the test switch 21, the horn switch 22, the speed sensor 23 and the control switch circuit 2B will be explained more fully with reference to FIGS. 3A, 3B and 3C.

Figure 3A:
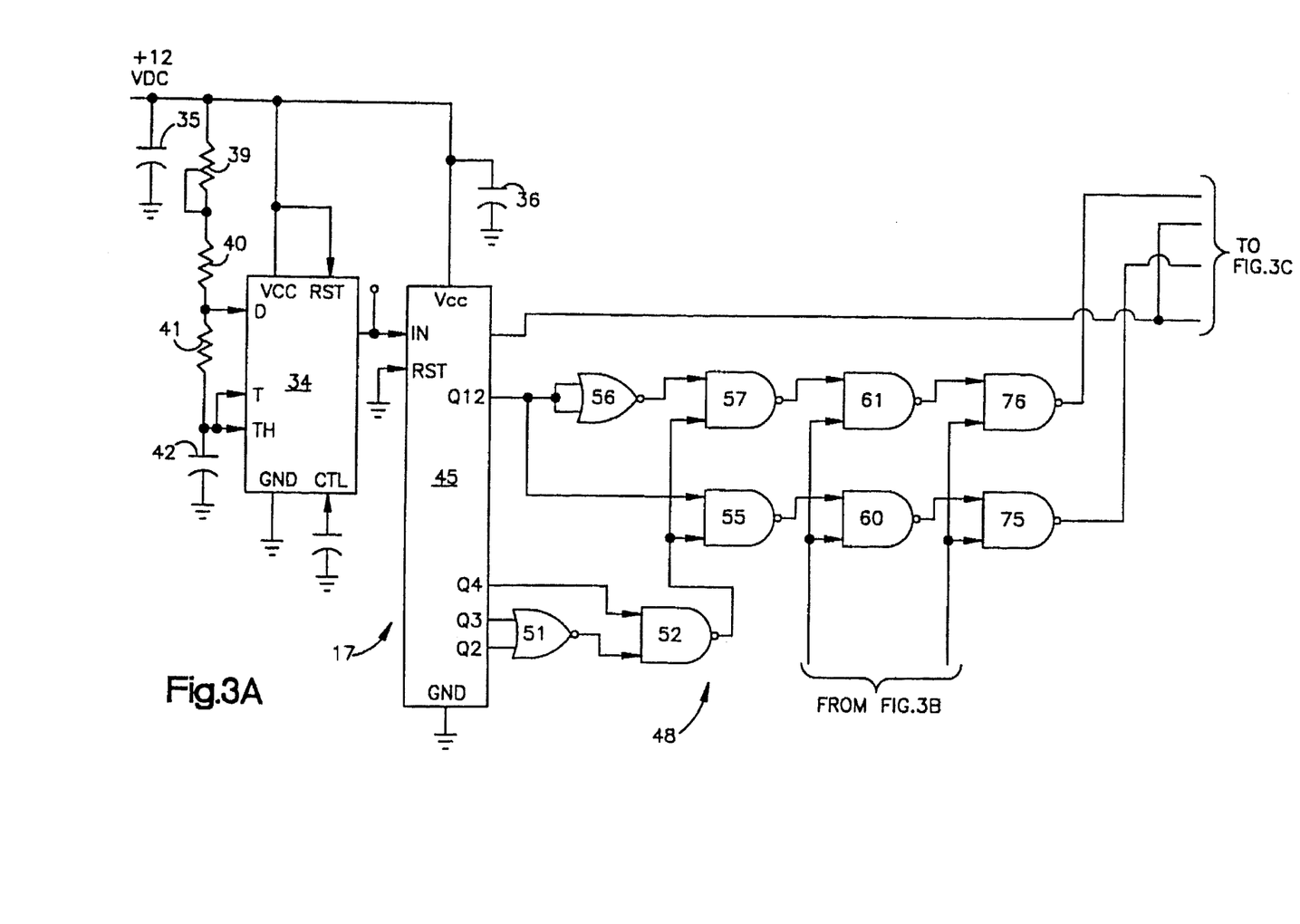
FIGS. 3A, 3B and 3C are connected portions of a detailed schematic diagram of a flashing circuit according to one embodiment of the invention.
Figure 3B:
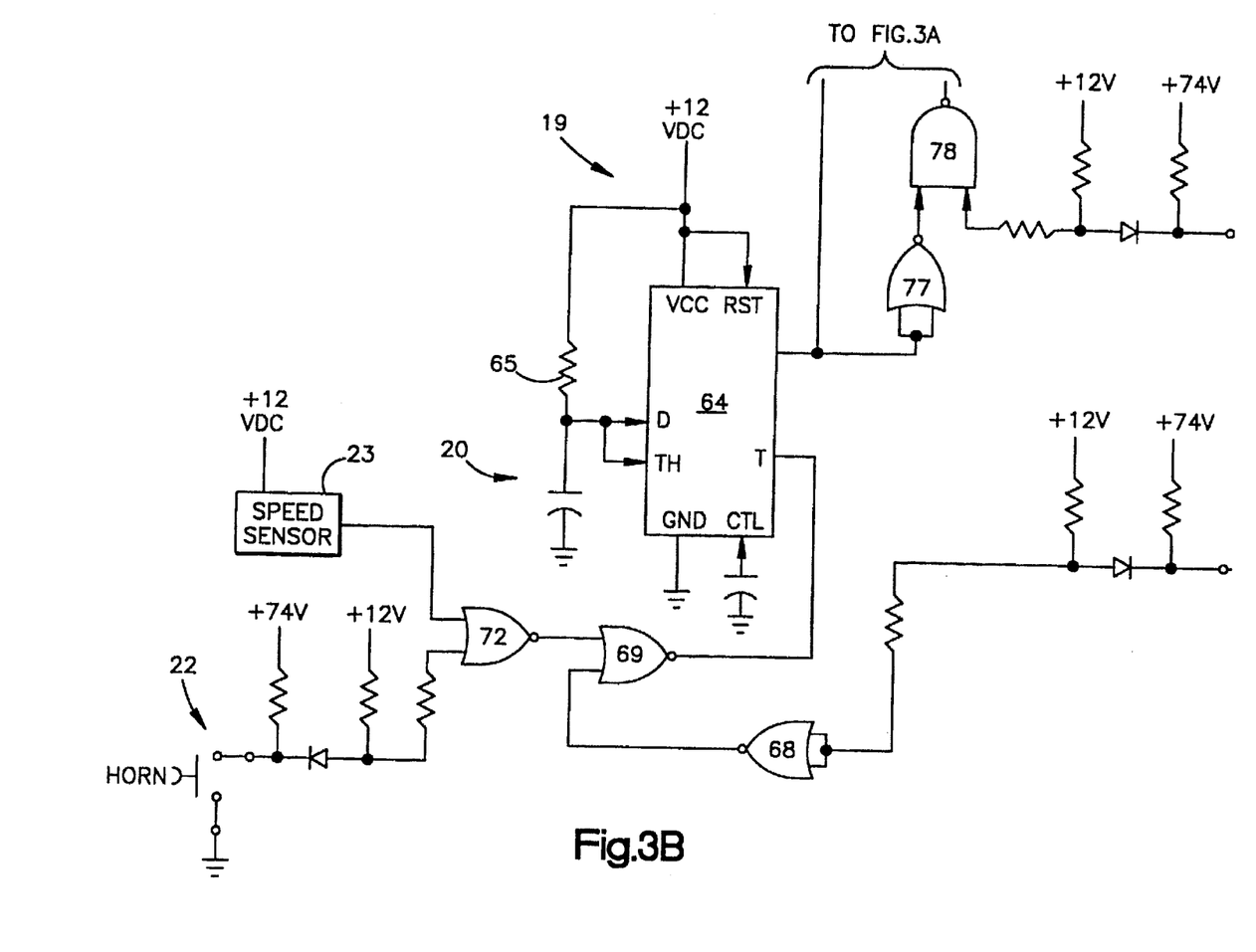
Figure 3C:
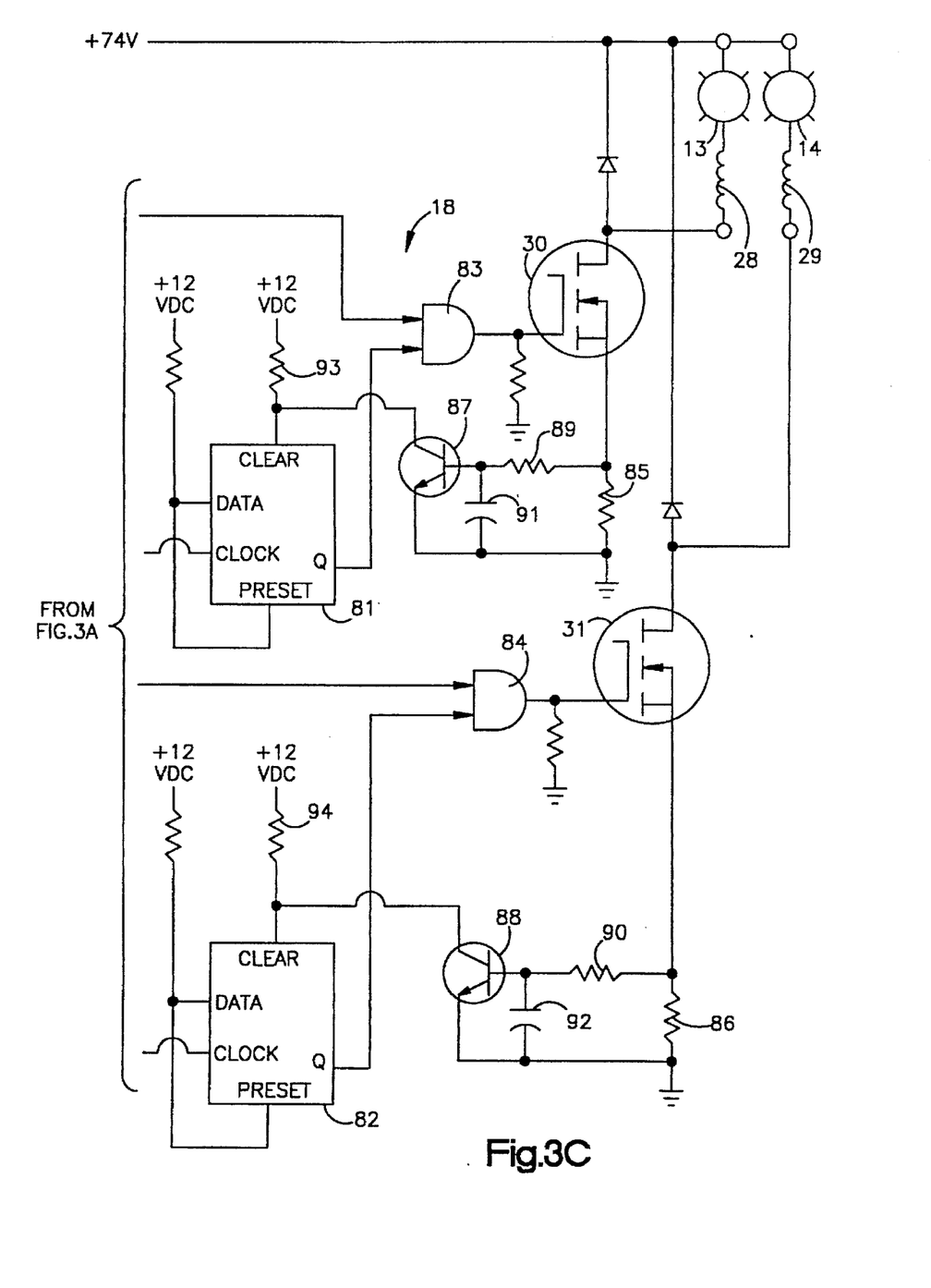

Referring to FIG. 3C, electrical elements, such as the pair of lights 13 and 14, are connected across a first voltage source. As shown, the voltage is a 74 volt DC source, which is commonly available on railroad locomotives. Inductors 28 and 29 can be provided to limit inrush current through the lights 13 and 14. Voltage across each of the lights 13 and 14 is controlled by a corresponding switch, such as field effect transistors 30 and 31. The transistors 30 and 31 have their sources and drains connected in series between the lights 13 and 14 and a ground to permit a current to flow through each of the lights 13 and 14 when its corresponding transistor is in a conducting state.

Illumination of the lights 13 and 14 is controlled by providing a signal at the gate of each of the transistors 30 and 31. Each light 13 and 14 is energized when the signal is "ON", placing the corresponding transistor 30 or 31 in a conducting state. The light 3 or 4 is not energized when the signal is "OFF", placing the transistor 30 or 31 in a nonconducting state.

The gating signal for the transistors 30 and 31 is provided by the pulsing circuit 17. Referring to FIG. 3A, the pulsing circuit 17 includes a means for generating clock pulses, such as a 555 timer 34. A second voltage source, such as 12 volts DC, is used to supply electronic components, such as the timer 34. Filter capacitors 35 and 36 can be connected between the 12 volt source and ground.

A potentiometer 39, resistors 40 and 41, and a capacitor 42 are connected in series between the 12 volts and ground. A tap between the resistors 40 and 41 is input to the discharge input D of the timer 34 to control the frequency of the output of the timer. A tap between the resistor 41 and the capacitor 42 is input to the trigger input T and to the threshold input TH of the timer 34 to continuously trigger the timer. The frequency of the clock pulses from the timer 34 is adjusted using the potentiometer 39. In the embodiment shown, a nominal output frequency of 4096 Hz is used. To achieve a 4096 Hz output with a 12 volt supply, the potentiometer 39 should be approximately 10 KΩ maximum resistance, the resistor 40 should be about 5.62 KΩ, the resistor 41 should be about 13 KΩ, and the capacitor 42 should be about 0.01 μF.

The clock pulses are input to a counter 45 to provide outputs having several different frequencies. For example, an eight- or twelve-stage counter can be used, each stage having an output at twice the frequency of the next stage.

The timer 34 and twelve-stage counter 45 are preferred for the embodiment shown. However, any means for generating a plurality of pulses at different frequencies can be used and is considered to be within the scope of the invention.

The outputs of the counter 45 are combined with a logic circuit 48 to achieve a desired frequency and duty cycle to generate a flashing sequence. In the embodiment shown in FIG. 3A, the logic circuit 48 produces a series of pulses at 256 Hz having a duty cycle of ⅛. The lights 13 and 14 are alternately flashed every ½ second. When one light 13 or 14 is "ON", the other light is "OFF". When a light 13 or 14 is "ON", it is fully energized. When a light 13 or 14 is "OFF", it is pulsed at 256 Hz and a ⅛ duty cycle, that is, the light is repeatedly energized for ½₀₄₈ second and de-energized for ⅞₀₄₈ second.

To achieve this flashing sequence, second- and third-stage outputs Q2 and Q3 of the counter 45, at 1024 Hz and 512 Hz, respectively, are input to a NOR gate 51. A fourth-stage output Q4 of the counter 45 is combined with the output of the NOR gate 51 in a NAND gate 52 to provide the 256 Hz, ⅛ duty cycle pulsing signal. The entire pulsing circuit 17 could comprise any means for generating a series of pulses having a duty cycle and a frequency which would maintain a light at a sufficiently dimmed level of illumination so as to be imperceptible relative to a fully illuminated light.

A twelfth-stage output Q12 of the counter 45, at 1 Hz, is combined with the pulsing signal in a NAND gate 55 to provide the flashing sequence to the light 14 by controlling the gating of the transistor 31. The inverse of the twelfth-stage output Q12, inverted by an inverter 56, is combined with the pulsing signal from the NAND gate 52 in a NAND gate 57 to provide the flashing sequence to the light 13 by controlling the gating of the transistor 30.

The enabling circuit 19, shown in FIG. 3B, is provided to control activation of the flashing sequence. The enabling circuit 19 enables the flashing sequence to control the transistors 30 and 31 to flash the lights 13 and 14. As shown in FIG. 3A, outputs of the enabling circuit 19 and outputs of the NAND gates 55 and 57 are input to respective enabling NAND gates 60 and 61.

Referring to FIG. 3B, the enabling circuit 19 includes the timing circuit 20 which uses a timer 64, such as a 555 timer. A resistor 65 is connected between 12 volts and the discharge input D and the threshold input TH of the timer 64 to control the frequency of the timer output. For vehicle applications, such as ditch lights for the railroad locomotive, the timer output should be in an "ON" condition for several seconds or even minutes. Thus, the value of the resistor 65 should be relatively high, on the order of 1.5 MΩ. The output of the timer 64 is the enabling circuit output which is input to the NAND gates 60 and 61.

The timer 64 can be triggered upon the occurrence of a specified condition by a condition responsive means. Several examples are shown which would be preferred for the locomotive ditch light flashing system.

One condition responsive trigger means shown is the test switch 21. The test switch 21 is connected to the trigger input T of the timer 64 through two NOR gates 68 and 69. When the test switch is closed, the trigger input T of the timer 64 is grounded, thereby placing the output of the timer 64 in an "ON" condition for a time dependent on the value of the resistor 65. When the output of the timer 64 is "ON", one of the inputs to each of the enabling NAND gates 60 and 61 is "ON". Thus, the circuit 48 is enabled to control the lights 13 and 14 with the flashing sequence from the outputs of the NAND gates 55 and 57.

The horn switch 22, closed when a horn on the locomotive is sounded, can be used to enable the flashing sequence in a similar manner to the test switch 21. As shown in FIG. 3B, the horn switch 22 is connected to the trigger input T of the timer 64 through the NOR gate 69 and a NOR gate 72 to ground the trigger input when the switch 22 is closed.

In place of the switch 22, a pressure-responsive switch may be located in the air line for the horn. The pressure-responsive switch would close whenever the horn is actuated and air pressure is supplied to the horn.

The speed sensor switch 23 can be connected to the trigger input T of the timer 64 through the NOR gates 69 and 72. The speed sensor 23 can be connected to a frequency-to-voltage converter which grounds the trigger input T when the speed of the locomotive falls within a selected range. For example, a locomotive in a switching yard may have its ditch lights disabled when the horn sounds and it is traveling very slowly. Thus, its speed sensor switch 23 would allow the horn switch 22 to trigger the timer 64 only when it senses that the speed of the locomotive is above a certain minimum level. Instead of sensing locomotive speed, the throttle switch 24 can be connected in a similar manner to the speed sensor 23 to enable the flashing sequence when the throttle is adjusted or is set within a selected range of locations.

Other condition responsive devices can be similarly connected to trigger the timer 64. Alternatively, a condition responsive device can be connected to directly enable the flashing sequence without a timer. This would be desirable when direct control is preferred rather than timed enabling of the flashing sequence. For example, when the throttle switch 24 is used, the locomotive may drift after the throttle is disengaged. Thus, a timer is preferred to maintain the flashing of the lights for a specified time after the throttle is disengaged. On the other hand, when a speed sensor 23 is used, the speed sensor would continue to enable the flashing sequence during the drifting of the locomotive. Thus, a timer might not be desired.

In some cases it may be desirable to fully illuminate the lights 13 and 14 without flashing. The control switch circuit 25 is provided for this purpose. As shown in FIG. 3B, the control switch 25 is connected to control the transistors 30 and 31 through control circuit NAND gates 75 and 76, in FIG. 3A. The control circuit NAND gates 75 and 76 also have inputs from outputs of the enabling NAND gates 60 and 61, respectively. The output of the enabling timer 64, inverted by a NOR gate 77, and the control switch circuit 25 are input to an override NAND gate 78 connected to the control circuit NAND gates 75 and 76.

The control switch 25 is normally closed to ground the input to the override NAND gate 78. This maintains one input to the control circuit NAND gates 75 and 76 in an "ON" state. Thus, the lights 13 and 14 are controlled by the other inputs to the NAND gates 75 and 76. When the control switch 25 is open and the output of the timer 64 is in an "OFF" state, both inputs to the override NAND gate 78 are "ON" and the outputs of control circuit NAND gates 75 and 76 are "ON", thereby fully illuminating the lights 13 and 14 so long as the control switch 25 is open and the output of the timer 64 is "OFF". When the output of the timer 64 is "ON", one input to the override NAND gate 78 is "OFF", and the output of the NAND gate 78 is "ON" so that the lights 13 and 14 are controlled by the outputs of the enabling NAND gates 60 and 61. Thus, the when the output of the timer 64 is "ON", the control circuit is overridden and the position of the control switch 25 is irrelevant. When the output of the timer 64 is "OFF", the control switch 25 fully illuminates the lights or completely extinguishes the lights.

The output from the NAND gates 75 and 76 is supplied to the overcurrent protection circuit 18 which is located between the NAND gates 75 and 76 and the transistors 30 and 31. The overcurrent protection circuit 18 comprises an identical pair of flip-flops or latches 81 and 82, which may be, for example, 74C74 units. The "clock" input of the latches 81 and 82 is connected to a tenth-stage output Q10 of the counter 45, at 4 Hz. The "data" and "preset" inputs of the latches 81 and 82 are tied to constant "ON" signals from the 12 volts DC source. The outputs Q of the latches 81 and 82 provide the inputs to AND gates 83 and 84, respectively. The other inputs of the AND gates 83 and 84 are the outputs of the NAND gates 76 and 75, respectively. The output of the AND gates 83 and 84 provides the gating signal for the FETs 30 and 31, respectively.

The sources of the FETs 30 and which are isolated from ground by resistors 85 and 86, respectively, are connected to the base of switching transistors 87 and 88, respectively, and provide the gate for the switching transistors. The resistors 85 and 86 should provide a fairly small voltage drop even for large currents, and a suitable value would be 0.025 Ω at 5 watts. The sources of the FETs 30 and 31 are also isolated from ground by resistors 89 and 90 and capacitors 91 and 92, respectively. Suitable values would be 220 Ω for the resistors 89 and 90 and 200 pF for the capacitors 91 and 92.

The switching transistors 87 and 88 are connected to operate the "clear" input of the latches 81 and 82, respectively, such that the "clear" input is normally "ON" by connection to the 12 volt DC source, when the switching transistor 87 or 88 is non-conducting, and the "clear" input is "OFF" by being grounded through the switching transistor when the switching transistor is conducting. When the switching transistor is conducting, the level of the "clear" input to the latch 81 and 82 is pulled down from the 12 volt DC source by resistors 93 and 94, respectively. A suitable value for the resistors 93 and 94 would be 10 KΩ.

In normal operation, the output of the NAND gates 76 and 75 is supplied through the AND gates 83 and 84, respectively, to operate the FETs 30 and 31, respectively, to flash or dim the lights 13 and 14, respectively. The sources of the FETs 30 and 31 are normally at or very close to ground, so that the transistors 87 and 88 normally receive an "OFF" gate signal and are normally non-conducting. The "clear" input to the latches 81 and 82 is thus constantly "ON" through connection to the 12 volt DC source. The latches 81 and 82 receive a clock pulse at the "clock" input every ¼ second. The output Q of A constant "ON" Q output is supplied by the latches 81 and 82 to the AND gates 83 and 84.

If the filaments of the lamps of either of the lights 13 or 14 burns out, this creates a momentary high level current flow which triggers the overcurrent protection circuit For example, if the filament of the lamp 13 fails, the current will rise substantially. The rate of rise is limited by the circuit inductance. The voltage across the resistor 85 also rises and provides on "ON" gating signal to the switching transistor 87 making the transistor 87 conducting, and effectively grounding the "clear" input of the latch 81. With the "clear" input to the latch 81 turned "OFF", the output Q of the latch is "OFF", the input to the AND gate 83 is "OFF" which makes the output of the AND gate 83 "OFF" regardless of the output of the NAND gate 76. This provides an "OFF" signal to the gate of the FET 30 and makes the FET 30 non-conducting, so that further current through the fused lamp of the light 13 is prevented.

The overcurrent protection circuit 18 then automatically resets itself. When the filament of the lamp of the light 13 has completely burned out, the lamp becomes an open circuit, and there is no longer a need for further overcurrent protection. The source of the FET 30 returns to ground, providing an "OFF" gating signal to the transistor 87 and making the transistor 87 non-conducting, which turns the "clear" input to the latch 81 "ON". The latch 81, however, stays in its latched state with the output Q "OFF" until the latch receives the next clock pulse at the "clock" input. Since the "clock" input is connected to the tenth-level output Q10 of the counter 45, the latch 81 will receive a clock pulse every ¼ second. When the clock pulse is received, the latch 81 resets, and the output Q turns back "ON", allowing the AND gate 83 to pass the signal from the NAND gate 76 on to the gate of the FET 30.

If the clock pulse is received by the latch 81 before the lamp 13 has completely burned out, the "clear" input to the latch 81 will continue to be "OFF", so the latch will not be reset and the output Q will continue to be "ON". The clock input is chosen as ¼ second because this is the minimum time necessary for the inductors 28 and 29 to decay based upon the values of this circuit. The clock rate may be varied depending upon the inductors 28 and 29 used and the values of other components.

While the operation of the overcurrent protection circuit 18 has been described with respect to the latch 81, the AND gate 83, the FET 30, the light 13 and the switching transistor 87, it is, of course understood that the other half of the overcurrent protection circuit composing the latch 82, the AND gate 84, the FET 31, the light 14 and the switching transistor 88 is essentially identical and operates in the same manner.

In the operation of the flashing sequence, referring to FIG. 2, the control switch 25 is normally deactivated so that the lights 13 and 14 are normally de-energized. At some point, one of the conditions for activating the flashing sequence, for example, sounding the horn, is satisfied. The horn switch 22 then triggers the timing circuit 20 which activates the pulsing circuit 17. The pulsing circuit 17 flashes the lights 13 and 14 by alternately energizing each and then pulsing each. The lights 13 and 14 continue flashing until the timing circuit 20 times out, for example, after 30 seconds, which deactivates the pulsing circuit 17 to de-energize the lights 13 and 14.

An alternative sequence might involve the control switch 25 being activated to fully energize the lights 13 and 14. An operator would then move the throttle to place the locomotive in motion and activate the throttle switch 24. The throttle switch 24 triggers the timing circuit 20 to activate the pulsing circuit 17. The timing circuit 20 overrides the control switch 25, and the lights 13 and 14 are flashed until the throttle switch 24 is deactivated and the timing circuit 20 times out, at which point the lights 13 and 14 are again fully energized under the control of the control switch 25.

Figure 4:
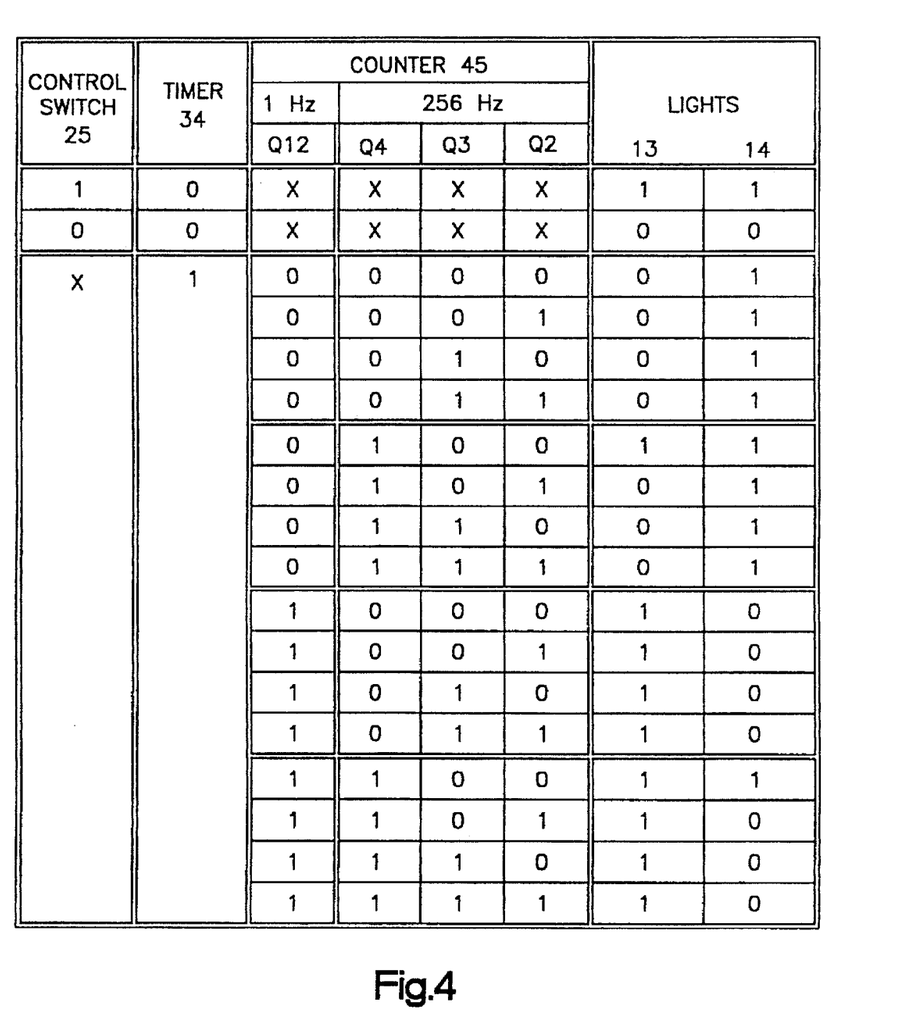
FIG. 4 shows a truth table for the flashing circuit.

FIG. 4 is a truth table showing the status of the lights 13 and 14 during different parts of the flashing sequence according to the preferred embodiment shown. It is given that the timer 34 is generating a 4096 Hz clock pulse, and the control switch 25 is in an "ON" state when it is open. A "1" condition represents "ON", and a "0" condition represents "OFF".

As seen in the FIG. 4, when the output of the enabling timer 34 is "OFF", the state of the counter 45 is irrelevant and the lights are controlled by the control switch 25. When the timer 34 is "OFF" and the control switch 25 is "ON", the lights 13 and 14 are "ON". When the timer 34 is "OFF" and the control switch 25 is "OFF", the lights 13 and 14 are "OFF".

On the other hand, the condition of the control switch 25 is irrelevant when the output of the enabling timer 34 is "ON". When the output of the enabling timer 34 is "ON", the lights 13 and 14 are controlled by the outputs of the counter 45 as combined by the logic circuit 48. As shown, the output Q12 is "OFF" for ½ second and "ON" for ½ second. During each 1 second cycle of the output Q12, the outputs Q4, Q3, and Q2 count from 0 0 0 to 1 1 1 at a rate of 256 Hz. Thus, during the ½ second that Q12 is "OFF", the outputs Q4, Q3, and Q2 cycle 128 times.

When the output Q4 is "ON" and the outputs Q3 and Q2 are "OFF", that is, 1 0 0, the light 13 is "ON". During the other seven possible states of the outputs Q4, Q3, and Q2, the light 13 is "OFF". Thus, the light 13 is "ON" during one of eight possible states, that is, ⅛ of the time. The 1 0 0 state occurs 128 times during the ½ second that the output Q12 is "OFF", thus, the light 13 is pulsed 128 times for ½048 second each time. In other words, the light 13 is pulsed at 256 Hz at a ⅛ duty cycle. When the output Q12 is "OFF", the light 14 is energized continuously.

After ½ second, the state of the output Q12 changes to "ON", and the light 13 is energized continuously. During the ½ second when the output Q12 is "ON", the light 14 is energized each time the outputs Q4, Q3, and Q2 are in a 1 0 0 state, respectively. Thus, the light 14 pulses 128 times for ½₀₄₈ second each time similarly to the pulsing of the light 13, described above.

Thus, it can be seen that the circuit shown in FIG. 3A alternately energizes and pulses each light in a flashing sequence.

Figure 5:
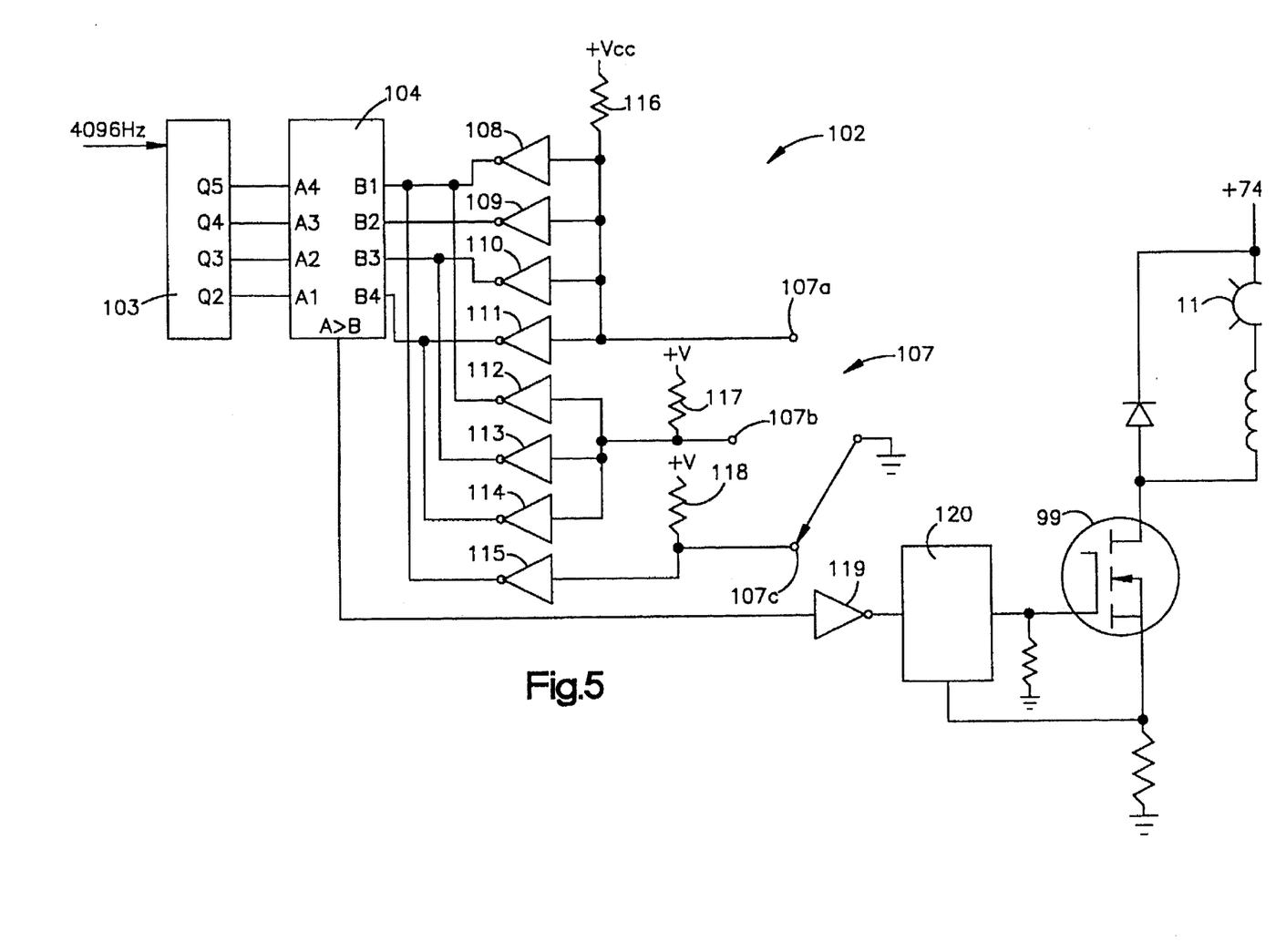
FIG. 5 shows a dimming circuit according to another embodiment of the invention.

Referring to FIG. 5, the present invention also comprehends a pulsing circuit which is used to dim a light, such as the headlight 11, without flashing. In the preferred embodiment shown, the light 11 is connected across a voltage, for example, 74 volts DC. A switch, such as a transistor 99, is used to control the voltage to the light 11.

A pulsing circuit 102 is used to generate pulses at different duty cycles. As shown, a twelve-stage counter 103 is provided with a clock input which can be generated similarly to the input to the counter 45 in FIG. 3A. The clock input has a substantially constant frequency, for example, 4096 Hz. The counter 103 generates a series of digital values. Outputs Q2, Q3, Q4, and Q5 of the counter 103, at 1024 Hz, 512 Hz, 256 Hz, and 128 Hz, respectively, are connected to A inputs of a digital comparator 104, such as a 74C85 four-bit magnitude comparator. The lowest frequency output Q5 is preferably connected to the least significant bit (LSB) A input of the comparator 104. The comparator 104 compares the magnitude (digital value) of the A inputs with the magnitude of B inputs to the comparator 104. The comparator 104 has three outputs, A>B, A=B, and A<B, one of which is "ON" depending on the relative magnitudes of the A and B inputs. In the present example, the A>B output is used.

A rotary selector switch 07, such as a single pole, multiple throw switch has its pole connected to ground. A bright position 107a of the switch is connected to four inverters 108, 109, 110 and 111, and each of the inverter outputs is connected to one of the B inputs of the comparator 104. A medium position 107b of the selector switch is connected through inverters 112, 113 and 114 to comparator inputs B1, B3, and B4, respectively, input B1 corresponding to the least significant bit. A dim position 107c of the switch 107 is connected through an inverter 115 to comparator input B1. Each switch position 107a, 107b, and 107c is also connected to a control voltage $V_{cc}$ through a resistor 116, 117 or 118, respectively. The A>B output of the comparator 104 is connected through an inverter 119 to the gate of the transistor 99. Preferably, an overcurrent protection circuit 120 essentially identical to either half of the overcurrent protection circuit 18 shown in FIG. 3C is placed between the output of the inverter 119 and the gate of the transistor 99.

When the magnitude of the A inputs is greater than the magnitude of the B inputs, the A>B output of the comparator 104 is "ON". In that condition, the transistor 99 is non-conducting, and the light 11 is not illuminated. When the magnitude of the A inputs is not greater than the magnitude of the B inputs to the comparator 104, the output of the comparator is "OFF", thus the transistor 99 is conducting, and the light 11 is illuminated.

In the configuration shown in FIG. 5, the switch 107 is used to select a four-bit digital value to be input to the B inputs of the comparator 104. The bright position 107a inputs a digital value of 1 1 1 1 (that is, 15 in decimal). The medium position 107b inputs a value of 1 0 1 1 (11 decimal), and the dim position 107c inputs a value of 1 0 0 0 (8 decimal).

Figure 6:
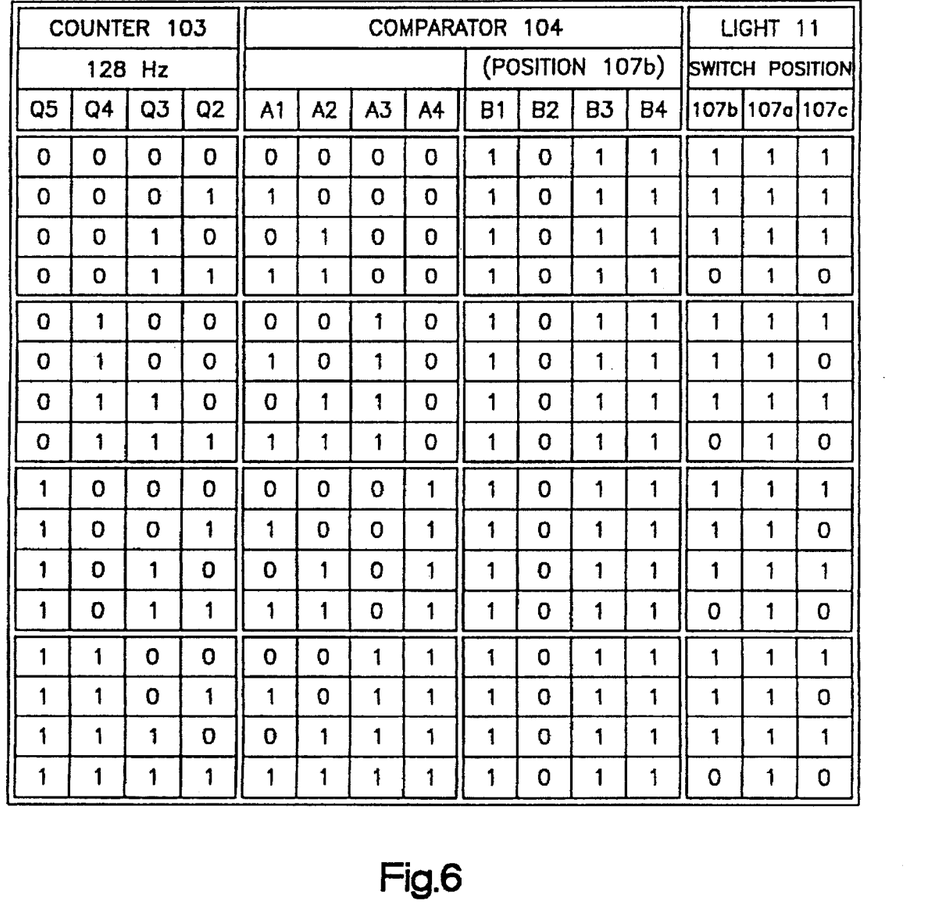
FIG. 6 shows a truth table for the dimming circuit.

Referring to FIG. 6, the outputs Q2, Q3, Q4, and Q5 from the counter 103 are shown in the first column. These correspond to the inputs A1, A2, A3, and A4 to the comparator 104 shown in the second column. Note, however, that the least significant bit output Q2 from the counter is the most significant bit (MSB) input A1 to the comparator 104. The reason for this is discussed below. As an example, it is assumed that the selector switch 107 is at the medium position 107b to provide the B inputs with the value 1 0 1 1, as shown in the third column. When the value of the A inputs is greater than 1 0 1 1, the light 11 is not illuminated. This occurs only when A1 and A2 are both "ON". When the value of the A inputs is not greater than 1 0 1 1, the light 11 is illuminated. As shown in the fourth column of FIG. 6, for switch position 107b, the light 11 is "ON" for three of every four counts of the counter 103. Thus, it is illuminated at 512 Hz and a ¾ duty cycle.

If the significance of the output bits from the counter 103 were not reversed, that is, if MSB Q5 input were used as MSB A1, the light 11 would still be illuminated at a ¾ duty cycle. However, the light would be illuminated for four consecutive counts of the counter 103 and extinguished for twelve subsequent counts. Thus, the frequency would be 128 Hz. Accordingly, by reversing the significance of the bits, smoother pulsing can be achieved without additional complexity.

Referring to the last two sub columns of the fourth column of FIG. 6, the illumination of the light 11 is shown when different switch 107 positions are selected. When the bright position 107a is selected, the B inputs to the comparator 104 are 1 1 1 1. Thus, A can never be greater than B with a four bit input and the light 11 is always "ON". When the dim position 107c is selected, the B inputs to the comparator 104 are 1 0 0 0. The light is illuminated when A is not greater than 1 0 0 0 (8 in decimal). Thus, the light is illuminated 9 of every 16 counts of the counter 103 for a 128 Hz, ⁹⁄₁₆ duty cycle pulse signal. Note that the pulses are evenly distributed with one additional pulse at counter output 0 0 0 1.

The frequency of the pulses can be adjusted by changing the frequency of the input to the counter 103 or by using different outputs from the counter 103. The duty cycles can be modified by inputting different values to the B inputs of the comparator 104. More flexibility can be provided by using more outputs from the counter 103 and a higher capacity comparator. An alternative configuration would use different combinations of logic gates similar to the flashing circuit of FIG. 3 to permit selection of a desired frequency or duty cycle with a selector switch. The desired frequency and duty cycles depend on the characteristics and application of the light 11.

Where the voltage supplied to the light 11 exceeds the rated voltage of the light, the full illumination provided by the bright position 107a of the switch 107 may be eliminated to prevent an excessive voltage across the light. In this way, the pulsing circuit 102 can be used to effectively drop the voltage without voltage dropping resistors. Further, the pulsing circuit 102 is not limited to dimming a light. The circuit could be used to dim, that is, reduce the effective voltage across, any electrical element or component.

Other variations and modifications of the specific embodiments herein shown and described will be apparent to those skilled in the art, all within the intended spirit and scope of the invention. While the invention has been shown and described with respect to particular embodiments thereof, these are for the purpose of illustration rather than limitation. Accordingly, the patent is not to be limited in scope and effect to the specific embodiments herein shown and described nor in any other way this is inconsistent with the extent to which the progress in the art has been advanced by the invention.

What is claimed is:

1. A control circuit for an element connectable across a voltage, comprising:

a switching circuit connected to control the voltage across the element;

a dimming circuit connected to control the switching circuit for selectively energizing the element with a series of voltage pulses at a specific duty cycle; and an overcurrent protection circuit connected to control the switching circuit, the overcurrent protection circuit sensing current through the element above a predetermined level and de-energizing the element in response thereto.

2. A control circuit according to claim 1, wherein the element is a light.

3. A control circuit according to claim 2, wherein the light is pulsed at a frequency of at least 128 Hz.

4. A control circuit according to claim 1, wherein the duty cycle is less than ¼ and greater than ¹⁄₁₆.

5. A control circuit according to claim 1, wherein the dimming comprises a pulse generating circuit for generating sequential pulse signals of different frequencies and a logic circuit for combining the pulse signals to an output which controls the switching circuit.

6. A control circuit according to claim 5, wherein the pulse generating circuit comprises a clock signal generator having its output connected to a counter input.

7. A control circuit according to claim 1, wherein the dimming circuit comprises a counter circuit for generating a series of digital counter values;

a selecting circuit for selecting a digital input value; and a comparing circuit for comparing the counter values with the input values connected to operate the switching circuit responsive to the relative magnitudes of the counter pulse and input value.

8. A control circuit according to claim 1, further comprising a selecting circuit for selecting between continuously energizing the element and pulsing the element.

9. A control circuit according to claim 1, further comprising a selecting circuit for selecting different pulse rates.

10. A control circuit according to claim 1, further comprising a selecting circuit for selecting different duty cycles.

11. A control circuit according to claim 1, wherein the overcurrent protection circuit includes a resetting circuit for automatically resetting the circuit after the current through the element returns below the predetermined level.

12. A light dimming circuit for a light connectable across a voltage, comprising:

a switching circuit connected to control the voltage across the light;

a dimming circuit connected to control the switching circuit for selectively energizing the light continuously or energizing the light with a series of voltage pulses at a specific duty cycle; and an overcurrent protection circuit connected to control the switch means, the overcurrent protection circuit Sensing current through the element above a predetermined level and de-energizing the element in response thereto.

13. A light dimming circuit according to claim 12, further comprising a selecting circuit for alternately selecting continuous energization and pulsing of the light.

14. A light dimming circuit according to claim 12, further comprising two lights adapted to be alternately energized and pulsed by the switching circuit so that one light is pulsed while the other light is energized.

15. A light dimming circuit according to claim 12, further comprising an enabling circuit for enabling the selective energization of the light.

16. A light dimming circuit according to claim 15, wherein the enabling circuit comprises an activator having an output, and an activator NAND gate combining the output of the dimming circuit with the activator output and connected to control the switching circuit.

17. A light dimming circuit according to claim 16, wherein the activator comprises a timer.

18. A light dimming circuit according to claim 15, further comprising a control switch circuit connected to energize the light, said enabling circuit being connected to disable the control switch circuit.

19. A light dimming circuit according to claim 12, further comprising a control switch circuit connected to energize the light.

* * * * *

UNITED STATES PATENT AND TRADEMARK OFFICE
CERTIFICATE OF CORRECTION

PATENT NO. : 5,646,453
DATED : July 8, 1997
INVENTOR(S) : Donald C. Wezek, et al.

It is certified that error appears in the above-indentified patent and that said Letters Patent is hereby corrected as shown below:

Column 3, line 40, after "pulsing circuit 17", should be inserted a period --.--.
Column 3, line 64, "2B" should be --25--.
Column 4, line 15, "3 or 4" should be --13 or 14--.
Column 6, line 62, after "30 and" should be inserted --31--.
Column 7, line 31, before "For" should be inserted --18.--.

Column 7, line 39, after "'OFF'" should be inserted a comma --,--.
Column 9, line 34, "07" should be --107--.
Column 9, line 55, after "'ON'" should be inserted a period --.--.
Column 12, line 18, "Sens-" should be --sens- --.

Signed and Sealed this

Twenty-eighth Day of October, 1997

Attest:

BRUCE LEHMAN

Attesting Officer

Commissioner of Patents and Trademarks